E. C. WACKWITZ.
Hot-Water Heating-Apparatus.
No. 165,277. Patented July 6, 1875.
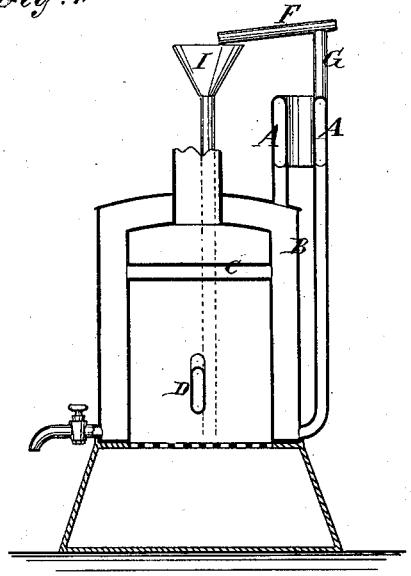
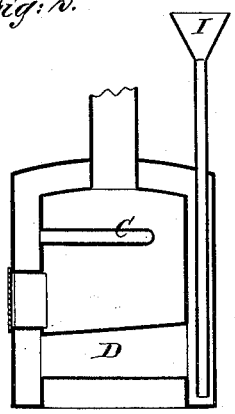
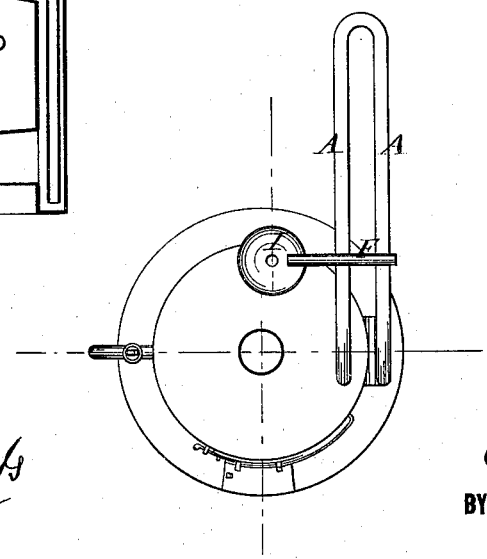
WITNESSES:
Alex F. Roberts
C. Sidgwick
INVENTOR:
E. F. Wackwitz
BY
ATTORNEYS.

UNITED STATES PATENT OFFICE.

ERNEST F. WACKWITZ, OF NEW YORK, N. Y.

IMPROVEMENT IN HOT-WATER HEATING APPARATUS.

Specification forming part of Letters Patent No. 165,277, dated July 6, 1875; application filed April 24, 1875.

*To all whom it may concern:*

Be it known that I, ERNEST F. WACKWITZ, of the city, county, and State of New York, have invented a new and Improved Hot-Water Apparatus, of which the following is a specification:

The invention will first be described in connection with drawing and then pointed out in the claim.

Figure 1 is a sectional elevation of my improved heating apparatus. Fig. 2 is a section taken on the line $y$ $y$, Fig. 1, and Fig. 3 is a plan view.

Similar letters of reference indicate corresponding parts.

A represents the circulating-pipes for conducting the hot water away from the heater B around the room, to be heated, and back to the heater, and C and D represent heating-pipes in the heater, which I propose to make flat and thin, so that they afford larger surface in proportion to capacity than round pipes do; and thus I will heat the surface with less water, which will not require so much fuel to heat it.

By practical tests I find the flat form I propose gives equal size of heating and radiating surface, with less than half the quantity of water that is contained in round pipes giving the same surface.

The pipe D extends through the fire, and the pipe C projects out from the front walls of the combustion-chamber into it in a manner calculated to be very effectually heated by an economical use of fuel. F is a cross-pipe on the top of the vertical overflow-pipe G, with both ends open, and inclined a little to the horizon, and with the highest end discharging into the air, while the lower one returns into a funnel, I, from which a pipe leads down in the heater nearly to the bottom for returning the water which may be forced up out of the overflow-pipe by expansion, while the steam will have freedom to escape, and thus relieve the heater. The funnel I also serves to gage the height of the water in the apparatus, and for filling the heater.

Having thus described my invention, I claim as new and desire to secure by Letters Patent—

The combination, with heater, of overflow-pipe G, open-ended cross-pipe F, and funnel I, as for the purpose specified.

ERNEST F. WACKWITZ.

Witnesses:
 T. B. MOSHER,
 ALEX. F. ROBERTS.